United States Patent
Nakahara

(10) Patent No.: US 7,297,401 B2
(45) Date of Patent: Nov. 20, 2007

(54) ELECTROCONDUCTIVE ADHESIVE AND ADHESIVE ARTICLE USING THE SAME

(75) Inventor: Yuushuke Nakahara, Miyakonojo (JP)

(73) Assignee: Sunny Sealing Co., Ltd. (JP)

( * ) Notice: Subject to any disclaimer, the term of this patent is extended or adjusted under 35 U.S.C. 154(b) by 341 days.

(21) Appl. No.: 10/987,862

(22) Filed: Nov. 11, 2004

(65) Prior Publication Data

US 2005/0276972 A1 Dec. 15, 2005

(30) Foreign Application Priority Data

Jun. 10, 2004 (JP) .............................. 2004-172928

(51) Int. Cl.
*B32B 7/12* (2006.01)
(52) U.S. Cl. ...................... 428/355; 428/343; 428/353; 428/354; 427/208.4; 156/325; 283/81
(58) Field of Classification Search ..................... None
See application file for complete search history.

(56) References Cited

U.S. PATENT DOCUMENTS 5,958,537 A * 9/1999 Akhter ....................... 428/40.2

OTHER PUBLICATIONS

M.Cusanovich,H.Akutsu, J.Hazzard "Cytochrome C3 as oriented iron wire", Engineering in medicine and biology, 11 Annual International Conference, 1989.*

* cited by examiner

*Primary Examiner*—James Seidleck
*Assistant Examiner*—Gennadiy Mesh
(74) *Attorney, Agent, or Firm*—Fattibene & Fattibene; Paul A. Fattibene; Arthur T. Fattibene

(57) ABSTRACT

The present invention provides an electroconductive adhesive having a heme protein mixed in a very small amount thereby exhibiting electrical conductivity without deteriorating adhesion, which is used on the surface of electronic parts or a label thereby preventing and eliminating static electricity and improving the efficiency of heat dissipation, as well as an adhesive article using the same. A heme protein having a porphyrin complex whose iron ion is divalent is added to an adhesive to confer electrical conductivity. At least one member selected from an electroconductive polymer, an electrolytic metal, and a pigment molecule is mixed with the resultant electroconductive adhesive.

1 Claim, No Drawings

ELECTROCONDUCTIVE ADHESIVE AND ADHESIVE ARTICLE USING THE SAME

BACKGROUND OF THE INVENTION

1) Field of the Invention

The present invention relates to an electroconductive adhesive and an adhesive article using the same and in particular to an adhesive for labels stuck on integrated circuit chips or electronic parts.

2) Description of the Related Art

Generally, labels used for electronic circuit elements are provided with a printing surface on the front and an adhesive layer made of a pressure-sensitive adhesive on the back, and the labels are stuck on electronic circuit parts to display tracking information and identification information on the parts.

The material constituting these labels is originally electrically insulated or not electroconductive so that upon release of the labels from liners, static electricity is generated, and its electric charge can be accumulated and discharged to damage parts therearound.

Generation of static electricity is a serious problem that causes breakdowns and damages to electrical circuit elements. Static electricity is generated as a result of imbalance in electric charges between the surfaces of articles (particularly insulators) upon being rubbed against each other or upon being released. These electric charges are accumulated on the surface of insulators to appear as static voltage. When the static voltage is high, the static electric charge is discharged all at once to cause the breakdown of articles as well as the internal breakage of electronic parts, semiconductor wafers etc.

For preventing or reducing a risk for frictional electricity to be charged, the labels are composed preferably of an electroconductive material. If the adhesive used therein is electroconductive, electric charges can be dissipated without damage.

As the technique of endowing such an adhesive with electrical conductivity, a technique described in Japanese Patent Application Laid-open No. H8-253755 is known.

The technique described in Japanese Patent Application Laid-open No. H8-253755 is constituted such that an electroconductive polymeric compound is mixed with an adhesive to give electrical conductivity to the adhesive, but the technique described in this publication cannot achieve electrical conductivity unless the polymeric compound is added in a large amount. When the polymeric compound is added, there is also a problem that the original adhesiveness of the adhesive is reduced.

As will be described later, it cannot be recognized that addition of the electroconductive polymer (polyaniline) in a very small amount (0.1 wt %) makes little difference in the electrical conductivity of most of adhesives.

As another general method of endowing an adhesive with electrical conductivity, a method that involves dispersing an electroconductive material such as metallic powders or particles of copper, silver, nickel, aluminum or tin in an adhesive has been adopted.

In these methods, however, there is still a problem that sufficient electrical conductivity cannot be achieved when the content of the electroconductive material in the adhesive is low, and thus a large amount of the electroconductive material should be contained in the adhesive. Accordingly, there are problems such as a reduction in adhesiveness of the adhesive and difficult applicability to the electronic parts/IC manufacturing industry owing to a high content of metallic particles and powders. Because the adhesive is disposed together with paper, film etc., there is also a problem such that, when metallic powders and particles are contained therein, the burden is put on the environment.

The present invention has been achieved in order to solve the above problems, and an object of the invention is to provide an electroconductive adhesive having a heme protein mixed in a very small amount thereby exhibiting electrical conductivity without deteriorating adhesion, which is used on the surface of electronic parts or a label thereby preventing and eliminating static electricity and improving the efficiency of heat dissipation, as well as an adhesive article using the same.

SUMMARY OF THE INVENTION

As means for achieving the above object, a first aspect of the present invention provides an electroconductive adhesive including a heme protein to confer electrical conductivity.

A second aspect of the present invention provides the electroconductive adhesive according to the first aspect, wherein the heme protein has a porphyrin complex whose iron ion is divalent.

A third aspect of the present invention provides the electroconductive adhesive according to the second aspect, wherein the heme protein having a porphyrin complex whose iron ion is divalent is obtained by adding a reducing agent.

A fourth aspect of the present invention provides the electroconductive adhesive according to any one of the first to the third aspects, wherein the mixing ratio of the heme protein to the adhesive is 0.01 to 20% by weight.

A fifth aspect of the present invention provides the electroconductive adhesive according to any one of the first to the fourth aspects, which includes at least one member selected from an electroconductive polymer, an electrolytic metal and a pigment molecule mixed therewith.

A sixth aspect of the present invention provides the electroconductive adhesive according to the fifth aspect, wherein at least one member selected from the group consisting of polyacetylene, polyparaphenylene, polypyrrole, polyaniline, polythiophene, polystyrene, polyphenylene vinylene and polyalkylene vinylene is used as the electroconductive polymer, a halogen metal and/or an alkali metal are used as the electrolytic metal, and at least one member selected from the group consisting of a metal porphyrin, a metal chlorophyll and a metal phthalocyanine is used as the pigment molecule.

A seventh aspect of the present invention provides an adhesive article using the electroconductive adhesive according to any one of the first to the sixth aspects as an adhesive layer of a label.

An eighth aspect of the present invention provides an adhesive article comprising the electroconductive adhesive according to any one of the first to the sixth aspects applied onto the surface of an electronic instrument, an electronic device or electronic parts.

DETAILED DESCRIPTIONS

Preferred embodiments to achieve the present invention will be explained below.

The present inventors have found that a heme protein is added in a very small amount to a general adhesive thereby giving electrical conductivity to the adhesive, to achieve the electroconductive adhesive of the present invention.

Among proteins occurring in cells of animals, plants and microorganisms, the heme protein is one kind of functional protein characterized by containing heme iron as an iron porphyrin complex, and has a unique function to transfer electrons by oxidation-reduction of heme iron. The heme protein works in transferring necessary electrons where energy is converted mainly in respiration and photosynthesis, where for example in photosynthesis, electrons necessary for synthesizing glucose etc. are removed from light. That is, the heme protein is a substance in the living body, which participates widely in a life phenomenon involving production of substances necessary for the living body or transfer of electrons.

Porphyrin is a cyclic compound having 4 pyrrole rings bound to one another via a methine group, and forms a metal porphyrin complex upon incorporation of various kinds of metal ions into the center. In the natural world, there are a large number of heme proteins such as hemoglobin and cytochrome, and their structure has iron ion as central metal.

The heme protein occurs usually in 2 forms, one of which has ferriheme (heme-$Fe^{3+}$) and the other of which has ferroheme (heme-$Fe^{2+}$).

Ferriheme is an electrically insulating protein having a trivalent iron ion in a porphyrin complex, and it is not effective to use the ferriheme directly in an electroconductive adhesive. On one hand, ferroheme is an electroconductive protein having a divalent iron ion in an iron porphyrin complex. When the ferriheme protein is converted into a ferroheme (heme-$Fe^{2+}$) protein by reducing heme in the ferriheme protein, the resulting heme protein has electrical conductivity.

Examples of these heme proteins include cytochrome c, hemoglobin, catalase and cytochrome p-450. These heme proteins are generally commercially available, and such commercial products can be used in the present invention.

As the adhesive mixed with the heme protein, it is possible to employ general adhesives such as a thermosetting adhesive (hot-melt type), a thermoplastic adhesive, a composite polymer adhesive, a rubber adhesive, a hydrophilic naturally occurring polymeric adhesive, and an acrylic or silicon adhesive.

In the present invention, the heme protein is added in a very small amount to these general adhesives to provide electroconductive adhesives having an electrical conductivity of $10^{-10}$ to $10^{-1}$ S/m.

Hereinafter, the present invention is described in more detail by reference to Examples 1 to 7.

EXAMPLE 1

The electroconductive adhesive in Example 1 is described.

1 mg ascorbic acid was added to 1 g cytochrome c and stirred, and the mixture was mixed with 1000 g acrylic adhesive and stirred to give the electroconductive adhesive.

In cytochrome c as heme protein, the ionic value of heme iron is reduced from trivalence to bivalence by action of ascorbic acid, to endow the heme protein itself with electrical conductivity, and the heme protein is diffused into the acrylic adhesive to endow the whole of the adhesive with electrical conductivity, as well.

While the inherent electrical resistance (resistivity) of the acrylic adhesive was $3.3 \times 10^{12}$ Ω·m (1), the resistivity of the electroconductive adhesive in Example 1 was $4.7 \times 10^{5}$ Ω·m (3) and thus confirmed to be significantly electroconductive as compared with (1) and (2), as shown in Table 1.

In Example 1, ascorbic acid (vitamin C) was added as the reducing agent, but other known reducing agents such as cytochrome c oxidase and $Na_2S_2O_4$ can be used as the reducing agent.

The mixing ratio of the heme protein is determined suitably depending on applications of the adhesive, but is preferably in the range of 0.01 to 20% by weight relative to the adhesive.

The mixing ratio of the reducing agent is also arbitrary, but is preferably 0.01 to 0.5% by weight relative to the heme protein.

TABLE 1

| Adhesive | Inherent resistance (resistivity) ρ (Ω · m) |
|---|---|
| (1) Acrylic adhesive A | $3.3 \times 10^{12}$ |
| (2) Adhesive A + polyaniline (0.1 wt %) | $3.6 \times 10^{11}$ |
| (3) Adhesive A + cytochrome c (0.1 wt %) | $4.7 \times 10^{5}$ |
| (4) Adhesive A + cytochrome c (0.1 wt %) + polyaniline (0.05 wt %) | $2.4 \times 10^{4}$ |

EXAMPLE 2

The electroconductive adhesive in Example 2 is described.

1 mg $LiBH_4$ (lithium borohydride) was added to 1 g hemoglobin and stirred, and the mixture was mixed with 1000 g acrylic adhesive and stirred to give the electroconductive adhesive.

In hemoglobin as heme protein, the ionic value of heme iron is reduced from trivalence to bivalence by action of $LiBH_4$, to endow the heme protein itself with electrical conductivity, and the heme protein is diffused into the acrylic adhesive to endow the whole of the adhesive with electrical conductivity, as well.

The resistivity of the electroconductive adhesive in Example 2, similar to that in Example 1, was about $4.7 \times 10^{5}$ Ω·m and thus the adhesive was confirmed to be significantly electroconductive.

In this example, $LiBH_4$ was added as the reducing agent, but other known reducing agents such as metohemoglobin reductase can be used as the reducing agent.

The mixing ratio of the heme protein is determined suitably depending on applications of the adhesive, but is preferably in the range of 0.01 to 20% by weight relative to the adhesive.

The mixing ratio of the reducing agent is also arbitrary, but is preferably 0.01 to 0.5% by weight relative to the heme protein.

EXAMPLE 3

The electroconductive adhesive in Example 3 is described.

1 mg $Na_2S_2O_4$ (sodium sulfite) was added to 1 g catalase and stirred, and the mixture was mixed with 1000 g acrylic adhesive and stirred to give the electroconductive adhesive.

In catalase as heme protein, the ionic value of heme iron is reduced from trivalence to bivalence by action of $Na_2S_2O_4$, to endow the heme protein itself with electrical conductivity, and the heme protein is diffused into the acrylic adhesive to endow the whole of the adhesive with electrical conductivity, as well.

The resistivity of the electroconductive adhesive in Example 3, similar to that in Example 1, was about $4.7\times10^5$ $\Omega\cdot m$ and thus the adhesive was confirmed to be significantly electroconductive.

In this example, $Na_2S_2O_4$ was added as the reducing agent, but other known reducing agents can be used as the reducing agent.

The mixing ratio of the heme protein is determined suitably depending on applications of the adhesive, but is preferably in the range of 0.01 to 20% by weight relative to the adhesive.

The mixing ratio of the reducing agent is also arbitrary, but is preferably 0.01 to 0.5% by weight relative to the heme protein.

EXAMPLE 4

The electroconductive adhesive in Example 4 is described.

1 mg ascorbic acid was added to cytochrome P-450 (1 g) and stirred, and the mixture was mixed with 1000 g acrylic adhesive and stirred to give the electroconductive adhesive.

In cytochrome P-450 as heme protein, the ionic value of heme iron is reduced from trivalence to bivalence by action of ascorbic acid, to endow the heme protein itself with electrical conductivity, and the heme protein is diffused into the acrylic adhesive to endow the whole of the adhesive with electrical conductivity, as well.

The resistivity of the electroconductive adhesive in Example 4, similar to that in Example 1, was about $4.7\times10^5$ $\Omega\cdot m$ and thus the adhesive was confirmed to be significantly electroconductive.

In this example, ascorbic acid was added as the reducing agent, but other known reducing agents such as NADH and NADPH can be used as the reducing agent.

The mixing ratio of the heme protein is determined suitably depending on applications of the adhesive, but is preferably in the range of 0.01 to 20% by weight relative to the adhesive.

The mixing ratio of the reducing agent is also arbitrary, but is preferably 0.01 to 0.5% by weight relative to the heme protein.

EXAMPLE 5

The electroconductive adhesives in Example 5 comprise at least one member selected from an electroconductive polymer, an electrolytic metal and a pigment molecule mixed with the electroconductive adhesives in Examples 1 to 4.

At least one member selected from polyacetylene, polyparaphenylene, polypyrrole, polyaniline, polythiophene, polystyrene, polyphenylene vinylene and polyalkylene vinylene is used as the electroconductive polymer.

A halogen metal and/or an alkali metal are used as the electrolytic metal.

At least one member selected from a metal porphyrin, a metal chlorophyll and a metal phthalocyanine is used as the pigment molecule.

The electroconductive polymer, electrolytic metal and pigment molecule are electroconductive materials, and these are mixed suitably depending on applications thereby achieving electrical conductivity stably and reliably to enable fine adjustment of electrical conductivity.

As shown in Table 1 (4), electrical conductivity is promoted by adding polyaniline.

EXAMPLE 6

In the adhesive articles in Example 6, the electroconductive adhesives obtained in Examples 1 to 5 are used as an adhesive layer on the back of a label.

The adhesive layer is applied thinly and uniformly on the back of a sheet label, and the applied surface is endowed with electrical conductivity.

Generally, static electricity is generated upon rubbing insulators against one another, but by applying the electroconductive adhesive onto the back of a label, the generation of static electricity upon release of the label is reduced, and the accumulated static electricity is gradually discharged through the electroconductive adhesive so that sparking and the internal breakage of electronic parts and semiconductor wafers by sparking can be prevented.

EXAMPLE 7

In the adhesive articles in Example 7, the electroconductive adhesives obtained in Examples 1 to 5 are applied onto the surface of an electronic instrument, an electronic device and electronic parts.

The electroconductive adhesive is applied onto the surface of the electronic instrument, electronic device and electronic parts, whereby the static electricity accumulated on the articles is gradually discharged from the surface thereof, to prevent the sparking damage to the parts.

The conventional adhesive is not only an electrical insulator but also a thermal insulator. And the electroconductive adhesive has higher thermal conductivity than that of the electrical insulating adhesive. Accordingly, the electroconductive adhesive can be applied on the surface of the articles to dissipate heat efficiently and to prevent accumulation of heat and thermal damage to parts.

While the present invention has been described in detail with reference to the Examples, the concrete constitution of the present invention is not limited to the Examples, and various modifications to design without departing from the gist of the present invention will also be included in the invention.

For example, a method of performing the reduction reaction (that is, for changing the valance of heme iron from trivalence to bivalence) by using electrodes to apply potential from the outside to the heme protein also falls under the scope of the present invention.

The electroconductive adhesive according to the present invention and the adhesive article using the same have the following effects.

By adding a heme protein to the conventional adhesive, the electroconductive adhesive can be obtained.

Because the heme protein is used, the effect of electrical conductivity can be achieved in a smaller amount than by adding the electroconductive polymer.

The heme protein having a porphyrin complex whose iron ion is divalent is excellent in electroconductive performance, and thus this ferroheme protein can be used to efficiently confer electrical conductivity.

The electroconductive adhesive can be used as an adhesive layer in a label to reduce generation of static electricity and to prevent the damage to electronic parts caused by static-electricity sparking.

Further, the electroconductive adhesive is excellent in heat conductivity, and thus this electroconductive adhesive can be applied to the surface of electronic parts to improve heat dissipation and to improve the durability of the electronic parts and an electrical product.

The electroconductive adhesive makes use of the heme protein, and can thus be naturally decomposed after disposal by combination with a biodegradable adhesive, thus not adversely affecting the environment.

What is claimed is:

1. An adhesive article comprising:
   a label; and
   an electroconductive adhesive comprising a heme protein mixed with an adhesive placed on said label, wherein the hema protein comprises reduced cytochrome C and the mixing ratio of the reduced cytochrome C to the adhesive is 0.01% to 0.50% by weight.

* * * * *